United States Patent
Wang et al.

(10) Patent No.: US 8,554,271 B2
(45) Date of Patent: Oct. 8, 2013

(54) METHOD AND APPARATUS FOR PERFORMING NEIGHBOR SCANS ON A WIDE AREA NETWORK IN A MOBILE COMMUNICATION DEVICE OPERATING A PERSONAL AREA NETWORK

(75) Inventors: Huai Y. Wang, Coconut Creek, FL (US); Zaffer S. Merchant, Parkland, FL (US); Floyd D. Simpson, Lake Worth, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1376 days.

(21) Appl. No.: 11/772,160

(22) Filed: Jun. 30, 2007

(65) Prior Publication Data

US 2009/0005111 A1    Jan. 1, 2009

(51) Int. Cl.
- *H04M 1/00* (2006.01)
- *H04W 4/00* (2009.01)
- *H04L 12/26* (2006.01)

(52) U.S. Cl.
USPC ............ 455/553.1; 455/552.1; 455/41.2; 455/426.2; 455/560; 370/250

(58) Field of Classification Search
None
See application file for complete search history.

(56) References Cited

U.S. PATENT DOCUMENTS

| | | | |
|---|---|---|---|
| 5,796,727 A | 8/1998 | Harrison et al. | |
| 6,329,944 B1 | 12/2001 | Richardson et al. | |
| 7,095,754 B2 | 8/2006 | Benveniste | |
| 7,099,671 B2 | 8/2006 | Liang | |
| 7,117,008 B2 | 10/2006 | Bajikar | |
| 7,133,398 B2 | 11/2006 | Allen et al. | |
| 7,146,133 B2 | 12/2006 | Bahl et al. | |
| 7,319,715 B1 | 1/2008 | Souissi et al. | |
| 7,522,572 B2 | 4/2009 | Karaoguz | |
| 7,542,728 B2 | 6/2009 | Bitran et al. | |
| 7,545,787 B2 | 6/2009 | Bitran et al. | |
| 2003/0169697 A1 | 9/2003 | Suzuki et al. | |

(Continued)

FOREIGN PATENT DOCUMENTS

| EP | 1119137 A | 7/2001 |
|---|---|---|
| EP | 1729463 A | 12/2006 |
| WO | 2006/069352 A1 | 6/2006 |
| WO | 2007/002688 A2 | 1/2007 |

OTHER PUBLICATIONS

Arto Palin and Mauri Honkanen, "VoIP Call Over WLAN with Bluetooth Headset—Multiradio Interoperability Solutions", IEEE 16th International Symposium on Personal, Indoor and Mobile Radio Communications, XP010927402, Sep. 11-14, 2005, pp. 1560-1564, vol. 3, Piscataway, New Jersey, USA.

(Continued)

*Primary Examiner* — Jinsong Hu
*Assistant Examiner* — William Nealon
(74) *Attorney, Agent, or Firm* — Scott M. Garrett; Sylvia Chen

(57) ABSTRACT

A mobile communication device (102) includes both a wide area network (WAN) radio modem (122), and a personal area network (PAN) radio modem (134), which operate on similar frequencies. When the both the WAN and PAN modems are operating and carrying time-sensitive data, the WAN modem disables transmission by the PAN modem when the WAN modem is due to receive data from a WAN base station (406), including neighbor scans. The duration and frequency of disabling the PAN modem is controlled so that the retransmission is successful.

8 Claims, 4 Drawing Sheets

(56) References Cited

U.S. PATENT DOCUMENTS

| | | | |
|---|---|---|---|
| 2004/0162106 A1 | 8/2004 | Monroe et al. | |
| 2004/0242159 A1 | 12/2004 | Calderon et al. | |
| 2005/0025174 A1 | 2/2005 | Fischer et al. | |
| 2005/0059347 A1* | 3/2005 | Haartsen | 455/41.2 |
| 2005/0246754 A1 | 11/2005 | Desai et al. | |
| 2005/0286476 A1 | 12/2005 | Crosswy et al. | |
| 2006/0205401 A1* | 9/2006 | Palin et al. | 455/425 |
| 2006/0215601 A1* | 9/2006 | Vleugels et al. | 370/328 |
| 2006/0221917 A1 | 10/2006 | McRae | |
| 2006/0239223 A1 | 10/2006 | Sherman et al. | |
| 2006/0246932 A1 | 11/2006 | Liang | |
| 2006/0252418 A1 | 11/2006 | Quinn et al. | |
| 2006/0262739 A1 | 11/2006 | Ramirez et al. | |
| 2006/0281436 A1 | 12/2006 | Kim et al. | |
| 2006/0292987 A1 | 12/2006 | Ophir et al. | |
| 2007/0066314 A1 | 3/2007 | Sherman et al. | |
| 2007/0124478 A1 | 5/2007 | Abdelhamid et al. | |
| 2007/0135162 A1 | 6/2007 | Banerjea et al. | |
| 2007/0153723 A1 | 7/2007 | Souissi et al. | |
| 2007/0183383 A1* | 8/2007 | Bitran et al. | 370/338 |
| 2007/0184835 A1* | 8/2007 | Bitran et al. | 455/434 |
| 2007/0232358 A1* | 10/2007 | Sherman | 455/560 |
| 2007/0275746 A1* | 11/2007 | Bitran | 455/509 |
| 2008/0056193 A1 | 3/2008 | Bourlas et al. | |
| 2008/0101279 A1 | 5/2008 | Russell et al. | |
| 2008/0113692 A1 | 5/2008 | Zhao et al. | |
| 2008/0130620 A1 | 6/2008 | Liu et al. | |
| 2008/0130676 A1 | 6/2008 | Liu et al. | |
| 2008/0139212 A1 | 6/2008 | Chen et al. | |
| 2008/0144550 A1 | 6/2008 | Makhlouf et al. | |
| 2008/0146155 A1 | 6/2008 | Makhlouf et al. | |
| 2008/0146156 A1 | 6/2008 | Makhloug et al. | |
| 2008/0146172 A1 | 6/2008 | Makhlouf et al. | |
| 2008/0205365 A1 | 8/2008 | Russell et al. | |
| 2008/0212542 A1 | 9/2008 | Kung et al. | |
| 2009/0004972 A1 | 1/2009 | Wang et al. | |
| 2009/0005111 A1 | 1/2009 | Wang et al. | |
| 2009/0034444 A1 | 2/2009 | Wang et al. | |
| 2009/0252137 A1 | 10/2009 | Bitran et al. | |

OTHER PUBLICATIONS

Patent Cooperation Treaty, "Notification of Transmittal of the International Search Report and the Written Opinion of the International Searching Authority, or the Declaration" for International Application No. PCT/US2008/068449, Feb. 9, 2009, pp. 1-14.

Christian Hoymann and Markus Grauer, "WiMAX Mobility Support", Proceedings of ITG Conference, Oct. 2006, pp. 85-90.

IEEE, "Part 16: Air Interface for Fixed and Mobile Broadband Wireless Access Systems; Amendment 2: Physical and Medium Access Control Layers for Combined Fixed and Mobile Operation in Licensed Bands, and Corrigendum 1" (IEEE Std 802.16e-2005 and IEEE Std 802.16e-2004/Cor1-2005), Feb. 28, 2006, pp. i-xl, 1-11, and 228-234.

Zdenek Becvar and Jan Zelenka, "Implementation of Handover Delay Timer into WiMAX", Sixth Conference on Telecommunications, May 2007, pp. 401-404.

Patent Cooperation Treaty, "Notification of Transmittal of the International Search Report and the Written Opinion of the International Searching Authority, or the Declaration" for International Application No. PCT/US2008/071657, Nov. 28, 2008, pp. 1-9.

Patent Cooperation Treaty, "Notification of Transmittal of the International Search Report and the Written Opinion of the International Searching Authority, or the Declaration" for International Application No. PCT/US2008/068484, Dec. 4, 2008, pp. 1-19.

United States Patent and Trademark Office, "Office Action Summary" for U.S. Appl. No. 11/772,146, Apr. 5, 2010, pp. 1-13.

United States Patent and Trademark Office, "Notice of Allowance" for U.S. Appl. No. 11/831,170, May 20, 2010, 24 pages.

Patent Cooperation Treaty, "PCT Search Report and Written Opinion of the International Searching Authority" for International Application No. PCT/US2008/053555, Nov. 20, 2008, 13 pages.

United States Patent and Trademark Office, "Non-Final Rejection" for U.S. Appl. No. 11/680,068, Jun. 25, 2010, 31 pages.

Patent Cooperation Treaty, "PCT Search Report and Written Opinion of the International Searching Authority" for International Application No. PCT/US2007/081170, Apr. 10, 2008, 14 pages.

Lior Ophir et al.; Wi-Fi (IEEE 802.11) and Bluetooth Coexistence: Issues and Solutions; 15th IEEE International Symposium on Personal, Indoor and Mobile Radio Communications 2004; Sep. 5-8, 2004; pp. 847-852; vol. 2, XP010753961.

Carl Eklund et al.; IEEE Standard 802.16: A Technical Overview of the WirelessMAN(tm) Air Interface for Broadband Wireless Access; IEEE Communications Magazine; Jun. 2002; pp. 98-107; vol. 40, No. 6; IEEE Service Center; New York, NY, USA; XP001123517.

United States Patent and Trademark Office, "Non-Final Rejection" for U.S. Appl. No. 11/674,504, Aug. 5, 2009, 23 pages.

United States Patent and Trademark Office, "Final Rejection" for U.S. Appl. No. 11/674,504, Feb. 8, 2010, 22 pages.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16e-2004/Cor1-2005), Feb. 28, 2006, pp. 357-358.

Patent Cooperation Treaty, "PCT Search Report and Written Opinion of the International Searching Authority" for International Application No. PCT/US2007/081080, Apr. 8, 2008, 16 pages.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16e-2004/Cor1-2005), Feb. 28, 2006, pp. 228-231, XP002473897.

United States Patent and Trademark Office, "Non-Final Rejection" for U.S. Appl. No. 11/674,433, Aug. 6, 2009, 21 pages.

United States Patent and Trademark Office, "Final Rejection" for U.S. Appl. No. 11/674,433, Feb. 4, 2010, 19 pages.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16e-2004/Cor1-2005), Feb. 28, 2006, pp. 232-233.

United States Patent and Trademark Office, Non-Final Office Action Summary or U.S. Appl. No. 11/772,146, Oct. 19, 2011; 23 pages.

United States Patent and Trademark Office, "Non-Final Office Action" for U.S. Appl. No. 11/772,146, Oct. 26, 2012, 14 pages.

\* cited by examiner

METHOD AND APPARATUS FOR PERFORMING NEIGHBOR SCANS ON A WIDE AREA NETWORK IN A MOBILE COMMUNICATION DEVICE OPERATING A PERSONAL AREA NETWORK

FIELD OF THE INVENTION

The invention relates generally to the coexistence of a wide area network modem and a personal area network modem operating on similar frequencies within a mobile communication device, and more particularly to performing neighbor scans with the wide area network modem while the personal area network modem is supporting an active link.

BACKGROUND OF THE INVENTION

Mobile communication systems and devices are in widespread use in most metropolitan regions of the world. In many places, wireless communications service is even being deployed where there is no wired communication service, due to the lower cost of infrastructure equipment. As mobile communications technology has matured, various features and additional services have been added beyond simply circuit-switch radiotelephony. Data services have been added so that subscribers can access information over public wide area networks and wireless local area networks. Personal area networking has been implemented on many mobile communication devices to support wire-free connection to nearby accessories and components.

Lately interest has been focused on increasing the information throughput to and from subscriber devices over wide area wireless mobile networks. One technology that has garnered interest for providing high quality, high capacity service is that specified by the IEEE 802.16e specifications, known as the Worldwide Interoperability for Microwave Access, or "WiMax." This wireless technology provides orthogonal frequency division multiple access channels in frequency bands including frequency bands very near frequencies used by other wireless networks, including personal area networks such as that used by IEEE 802.15.1, known more popularly by the tradename "Bluetooth." While the WiMax technology offers an attractive format for communications and data service, it is expected that it will also be used in devices also using personal area network technology, which is entrenched in the marketplace.

However, the fact that their operating frequency bands may overlap or be near enough to each other to interfere with each other provides a problem. If the wide area network modem is transmitting when the personal area network modem is attempting to receive, the near field strength of the wide area network transmission will prevent reception of the personal area network information. Likewise, if the personal area network transceiver is transmitting when the wide area network transceiver is attempting to receive information from it's present serving base station or conduct neighbor scans, the strength of the personal area transmission may prevent reception of the wide area network information. Such collisions may slow the effective data rate of some data services, and the impact may be acceptable. However, with interest in voice over data, more commonly known as voice over internet protocol (VoIP), such collisions are unacceptable because, whereas low priority data can be retransmitted, real-time information such as voice data must be received with a certain quality of service to assure the integrity of the call. Therefore there is a need for a means by which the two technologies can coexist in a mobile communication device to provide high quality real-time data service while also supporting personal area networking.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
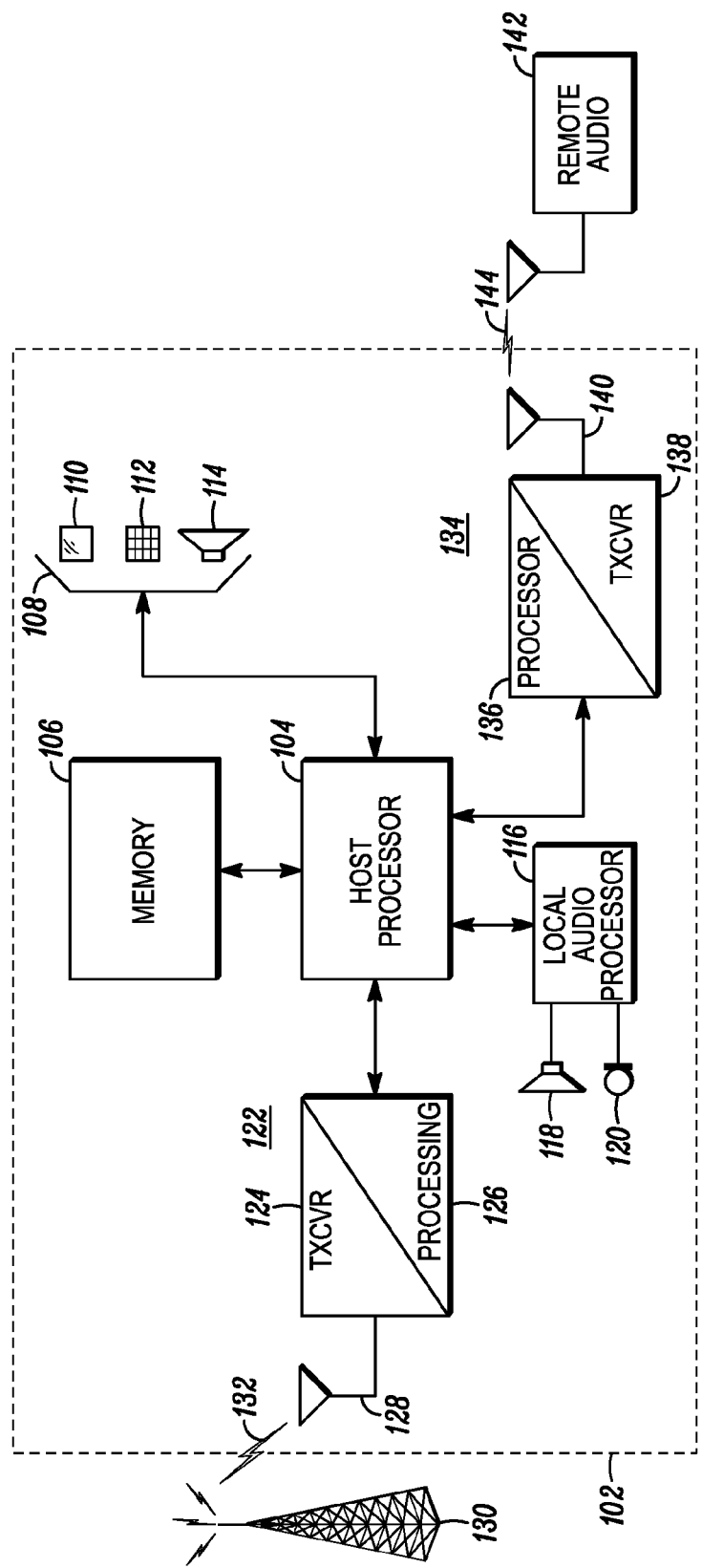
FIG. 1 shows a schematic block diagram of a mobile communication device, in accordance with an embodiment of the invention.

Referring now to FIG. 1, there is shown a schematic block diagram 100 of a mobile communication device 102, in accordance with an embodiment of the invention. A host processor 104 controls operation of the various components and subsystems of the mobile communication device. As shown here the host processor may be an abstraction of one or more microprocessors, digital signal processors and other such processor used routinely in the design of mobile communication devices. The host processor is coupled to a memory 106 which stores instruction code to be executed by the host processor. The memory may include read only memory (ROM) elements for long term storage, as well as executable memory for instantiating data structures and algorithms, and may include volatile and non-volatile components. To facilitate operation of the mobile communication device, a user interface 108 is provided, and includes, for example, a graphical display 110, a keypad and buttons 112, and other tactile, audible, and visual elements 114. To facilitate voice communication the mobile communication device includes an audio processor 116. The audio processor converts digital audio signals into analog audio signals to be played over a audio transducer 118 such as an earpiece or speaker. Likewise the audio processor converts sounds received at a microphone 120 into digital signals to be transmitted by the mobile communication device.

To facilitate mobile communication the mobile communication device comprises a wide area network (WAN) modem 122. The WAN modem is a radio modem having a radio transceiver portion 124 and a processor portion 126. The processor portion prepares data to be sent for transmission, and processes data received over the transceiver for further processing by the host processor. The WAN modem communicates with a WAN base station 130 over an air interface or radio link 132. In accordance with an embodiment of the invention, the WAN modem may operate, for example, in accordance with IEEE specification 802.16e-2005, commonly referred to as the "WiMax" specification, and operate in the 2.5-2.6 GHz band.

To facilitate personal area networking, the mobile communication device also comprises a personal area network (PAN) modem 134. The PAN modem likewise includes a processor portion 136 and a radio transceiver portion 138. The PAN modem communicates with one or more remote devices 142 over a low power radio link 144. Examples of such devices include wireless headsets/headphones and earpieces to facilitate hands free communication using the mobile communication device. The PAN modem may operate, for example, according to the IEEE 802.15.1 specification, also commonly referred to by the tradename "Bluetooth." The Bluetooth system operates in the 2.4-2.48 GHz band.

Because the WAN and PAN modems operate in such close proximity to each other both physically and in frequency of operation, transmissions by one can interfere with reception of the other one. This is especially significant given that the WAN will be used to carry real-time information such as VoIP calling, which will also be conducted over the PAN to a remote headset, earpiece, or automobile audio system, for example. That means both the WAN and PAN will be active at the same time, both carrying time-sensitive data, and both operating asynchronously with respect to each other. Furthermore, in addition to carrying real-time information, the WAN modem, being used for mobile communication, must periodically perform neighbor scans to identify and qualify likely handover candidate base stations. The WAN modem performs these scans during times when it is not transmitting or receiving real-time data. Transmission by the PAN modem while the WAN modem is performing neighbor scans would interfere with reception of neighbor cell signals at the WAN modem.

Figure 2:
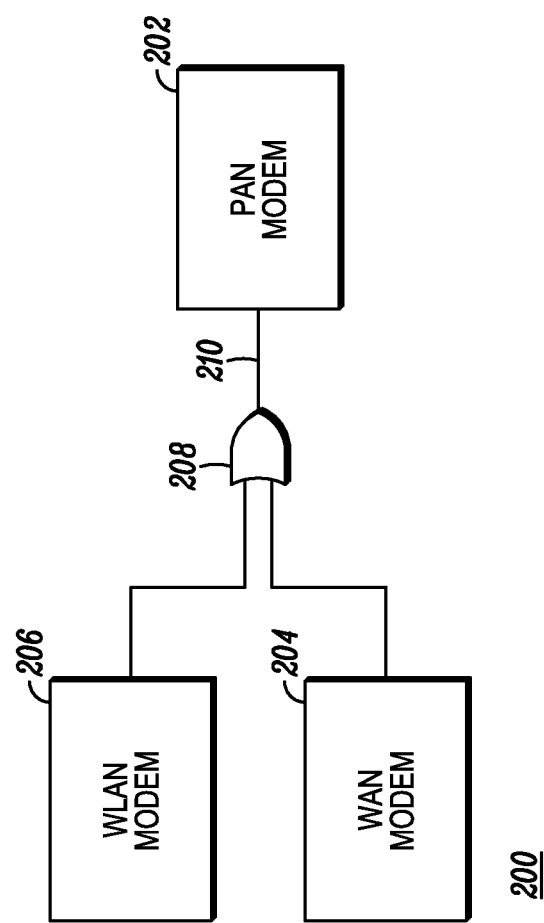
FIG. 2 shows a logic circuit arrangement 200 for a mobile communication device to preempt transmission by a PAN modem 202 of the mobile communication device, in accordance with an embodiment of the invention.

Referring now to FIG. 2, there is shown a logic circuit arrangement 200 for a mobile communication device to preempt transmission by a PAN modem 202 of the mobile communication device, in accordance with an embodiment of the invention. The mobile communication device includes a PAN modem and a WAN modem 204, and may also include a wireless local area network (WLAN) modem 206. Since WLAN operation as specified by the IEEE specification 802.11 specifications also operates in a similar band as the PAN, the WLAN may also preempt or disable transmissions by the PAN. Such operation is shown in published U.S. patent application no. 2006/0205401 A1, titled "METHOD AND APPARATUS FOR VOIP OVER WLAN TO BLUETOOTH HEADSET USING ADVANCED ESCO SCHEDULING." The WAN and WLAN modems are multiplexed though a logical OR gate 208 to a power amplifier shutdown line 210. If the WLAN modem is not present in the mobile communication device, than the WAN line would be directly connected to the shutdown line 210. When either the WAN or WLAN modems assert a shutdown signal, the PAN transmitter shuts or, or prevents operation of its transmitter so as not to interfere with reception at the WLAN or WAN.

Since the mobile communication device is a mobile device, using the WAN for mobile communications, the WAN modem must periodically check the signal condition of the present serving base station, as well as that of surrounding, or neighbor cell base stations to identify handover candidate base stations and threshold signal conditions which compel handover.

Figure 3:
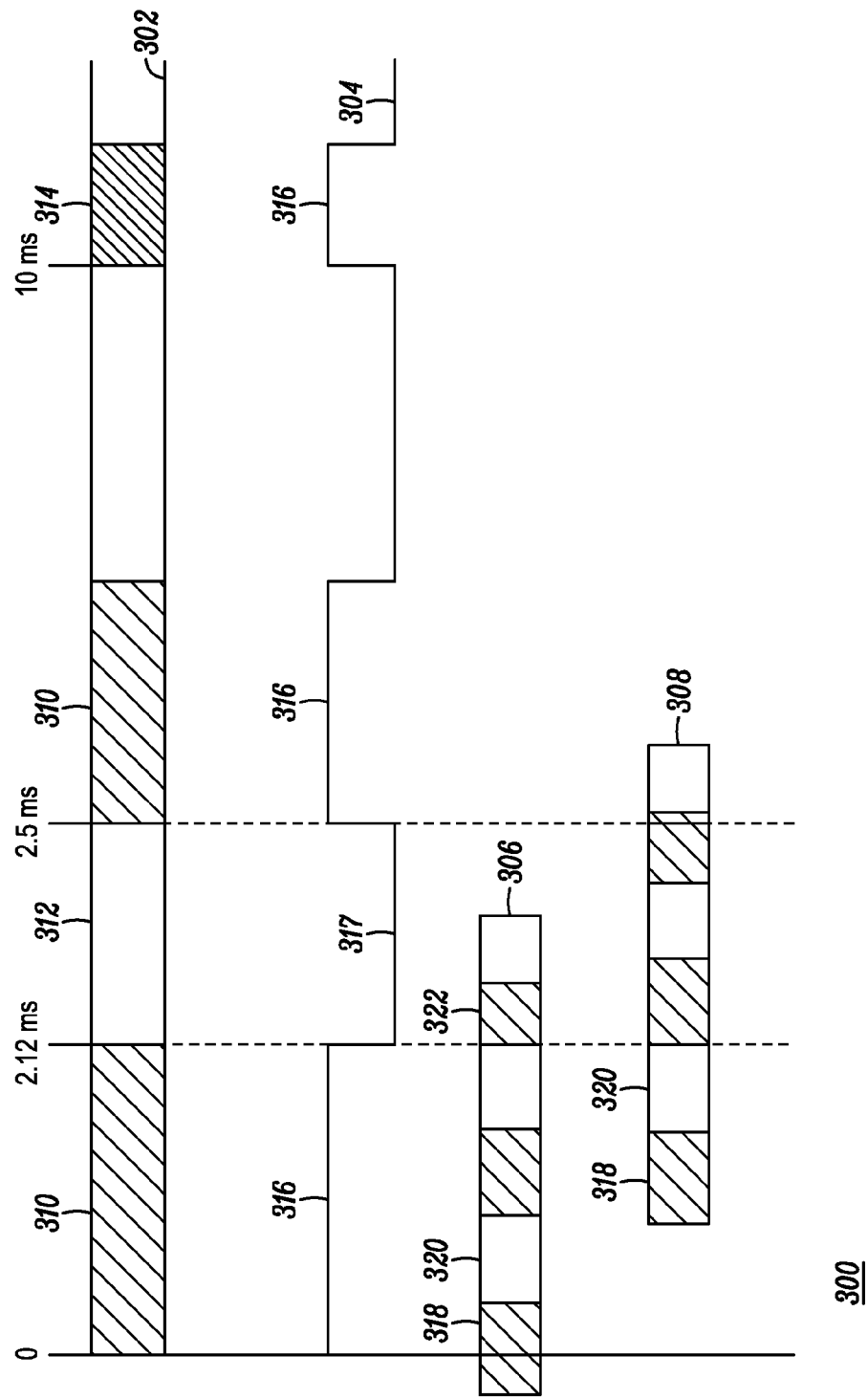
FIG. 3 shows a timing diagram 300 of signals occurring in a mobile communication device having both a WAN modem and a PAN modem, in accordance with an embodiment of the invention.

Referring now to FIG. 3, there is shown a timing diagram 300 of signals occurring in a mobile communication device having both a WAN modem and a PAN modem, in accordance with an embodiment of the invention. The signals shown for exemplary purposes here are a WAN signal 302, a PAN disable signal 304, a first PAN signal 306 and a second PAN signal 308. It is assumed here that the PAN modem is engaged in an active link with a remote device, and is operating using an in-frame retry or retransmission protocol. Two examples of the possible PAN signal occurrences are shown because the PAN and WAN networks operate asynchronously, and use different time bases. It is also assumed that the WAN and PAN are operating on substantially similar frequencies which, although are not the exact same frequency, are close enough that transmission by one modem interferes with receiving at the other modem. The first portion of the WAN signal from 0 to 10 milliseconds shows a scan interval. A scan interval is followed by a listen interval, where the WAN modem is receiving from, or transmitting to a WAN base station presently providing communication service. Typically the WAN interface alternates between scan and listen intervals, or sleep and listen intervals. In a typical WiMax VoIP configuration, there is a listen interval of two 5 ms frames followed by a scan/sleep interval of two 5 ms frame. Shown during the scan interval are two scan periods 310. A scan period is simply a period when the WAN modem is tuned away from the serving base station and receiving or attempting to receive a signal from a neighbor base station. Since the WAN modem is in receive mode during scan periods, the PAN modem must not transmit, or it will cause interference with reception at the WAN modem. Accordingly, during scan periods, the WAN modem asserts a PA Shutdown signal 316 to the PAN modem. The WAN modem can preempt PAN modem transmission because, even though the PAN is operating an active link, the PAN interface uses an time sliced or in-frame retransmission scheme, and the scan period durations and wait time spacing between consecutive scans is selected, as will be described in further detail, to allow successful operation of the PAN in-frame retransmission operation.

A typical Bluetooth eSCO period or frame has twelve 625 μs slots, with 3 pairs of alternating transmit 318 and receive 320 slots. The time sensitive data scheduled to be transmitted and received during a particular eSCO period or subframe only needs to occur on one of the three corresponding slots. Thus, if the data can't be transmitted, or isn't transmitted successfully during the first pair of transmission slots (a.k.a. the reserved window), there are two subsequent transmit slots where the transmission may be retried or retransmitted. Likewise for reception. In the first example PAN signal subframe 306, the subframe period begins slightly before the PA Shutdown signal 316 is asserted. However, the PA Shutdown signal does occur during the transmit slot of the PAN signal, causing transmission by the PAN modem to stop before the end of the transmit slot, which means the data that was being transmitted must be retransmitted in a subsequent transmit slot within the subframe period to reserve the temporal quality of the time-sensitive data being transmitted over the active link to the remote PAN device. Following the first transmit slot are a first receive slot, a second transmit slot, a second receive slot, whereupon, in the present example, the PA Shutdown signal is de-asserted. The PAN modem can receive during the first receive slot since receiving has no effect on the WAN reception. However, the second transmit slot also occurs when the PA Shutdown signal is asserted, so the PAN modem must be allowed to transmit during its third, and last in-frame transmission slot 322. Furthermore, to ensure successful transmission, the PA Shutdown signal must not be asserted again for a minimum wait period 317. Given that there are three transmit and receive slots in each Bluetooth eSCO subframe, the maximum duration of the scan period where the PA Shutdown signal is asserted, and minimum time of the wait period, combined, must not therefore exceed two thirds the duration of the 3.75 ms subframe, or 2.5 ms to guarantee at least one third of the WAN subframe will not be affected. Other WAN retransmission formats would allow for different combined scan plus wait durations. By analysis, it has been determined that an optimal maximum scan period should last no more than 2.12 ms, and an optimal spacing between consecutive scans minimum wait period should be at least 1.63 ms when the WAN is operating according to the WiMAX protocol, and the PAN is operating according to the Bluetooth protocol. A second PAN signal 308 shows the occurrence of the PAN subframe period with a different timing relative to the WAN signal. The first transmit slot is suppressed due to the assertion of the PA Shutdown signal, but the second transmit slot can be used to transmit. Upon termination of the scan interval, a listen interval commences with the transmission by the WAN base station of a map 314 of the listen interval. The map indicates when, in the listen interval, the downlink information for the mobile communication device will be transmitted, and when the mobile communication device can transmit uplink data. Since the map is must be received by the WAN modem, the PA Shutdown signal is asserted to prevent the PAN modem from transmitting.

Figure 4:
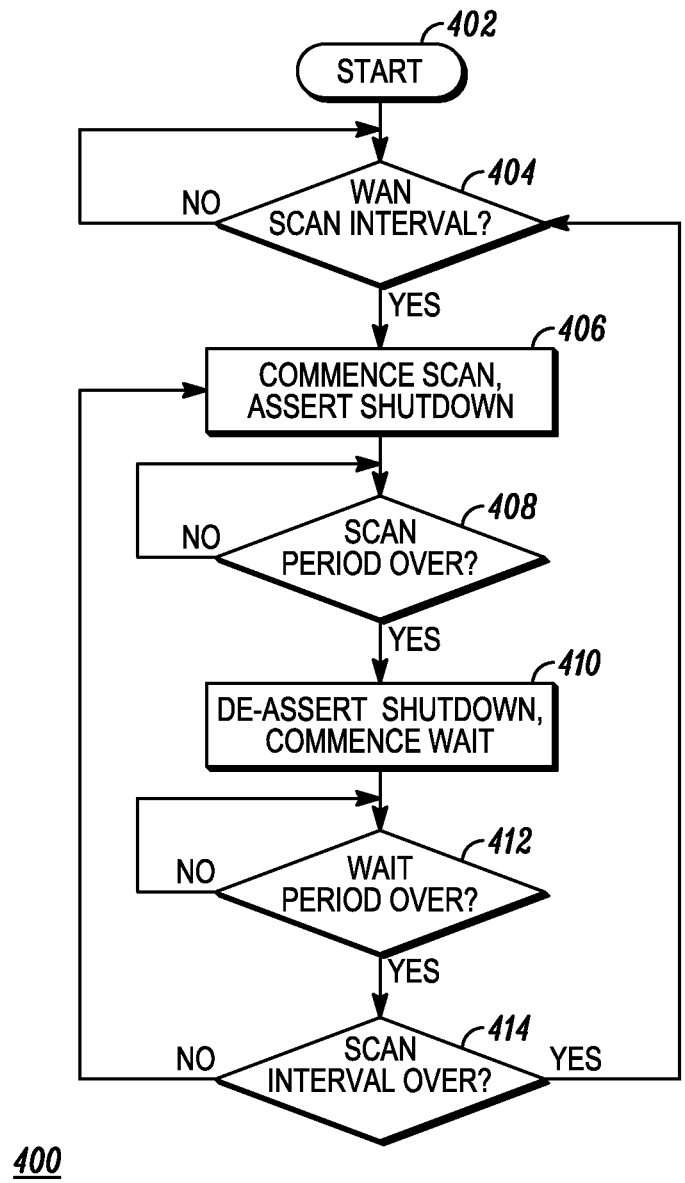
FIG. 4 shows a flow chart diagram 400 of a method of conducting neighbor cell scans at a WAN modem will facilitating successful operation of an in-frame retransmission protocol of a PAN modem, both operating within a mobile communication device, in accordance with an embodiment of the invention

Referring now to FIG. 4, there is shown a flow chart diagram 400 of a method of conducting neighbor cell scans at a WAN modem will facilitating successful operation of an in-frame retransmission protocol of a PAN modem, both operating within a mobile communication device, in accordance with an embodiment of the invention. At the start 402, the mobile communication device is powered up and conducting routine activity to facilitate communication. The PAN modem has established an active link using an in-frame retransmission protocol to carry time-sensitive date to and from a remote PAN device. The mobile communication device has detected the existence of the active link. To conduct neighbor scans, the WAN modem alternates between a listen interval and a scan interval. During a listen interval the WAN modem is tuned to a present serving WAN base station, and receiving data from, and transmitting data to the present serving base station. During a scan interval, the WAN modem is tuned away from the present serving WAN base station and receiving signals from neighbor WAN base stations. Upon the occurrence of a WAN scan interval 404, the WAN modem commences scanning neighbor WAN base stations and disable transmission by the PAN modem by, for example, asserting a PA Shutdown signal to the WAN modem (406). The WAN modem then commences scanning for not more than a maximum scan time 408. Upon ending the scan time, the PAN modem transmission is enabled by, for example, de-asserting the PA Shutdown signal 410, and waiting for at least a minimum wait period (412). The maximum scan period and minimum wait period are selected to ensure successful operation of the PAN retransmission protocol. Upon the end of the wait period, the WAN modem checks to see if the scan interval is over 414. If the scan interval is not over, and there is time for more scans, the method commences another scan period 406. If the scan interval is over or there is insufficient time remaining to conduct a scan, the method returns to wait for the start of the next scan interval 404. It will be appreciated by those skilled in the art that the method is only valid during scan intervals. Upon termination of a present scan interval, for example, the WAN may transition to a power save mode where, instead of a scan interval, the WAN experiences a sleep interval where the WAN modem is placed in a low power state.

This invention can be embodied in other forms without departing from the spirit or essential attributes thereof. Accordingly, reference should be made to the following claims, rather than to the foregoing specification, as indicating the scope of the invention.

What is claimed is:

1. A method for performing neighbor scans on a wide area network in a mobile communication device operating a personal area network, wherein the wide area network and personal area network operate on similar frequencies, the method comprising:
    establishing an active link between a personal area network modem and a remote device, the active link using an in-frame retransmission protocol;
    commencing a neighbor cell scan with a wide area network modem, comprising:
        disabling transmission by the personal area network using the active link for a scan time; and
        after an end of the scan time, enabling transmission by the personal area network using the active link for at least a minimum wait time;
    wherein the scan time maximum is equivalent to a personal area network frame duration minus a last in-frame retransmission slot duration and the wait time minimum is equivalent to the last in-frame retransmission slot duration.

2. The method of claim 1, wherein the personal area network has a period of 7.5 milliseconds and 3 pairs of alternating transmit and receive slots, each scan shall last no longer than 2.12 milliseconds and the spacing between consecutive scans is not less than 1.63 milliseconds.

3. The method of claim 1, wherein the wide area network alternates between a listening interval and a sleep/scan interval, commencing the neighbor cell scan is performed only during sleep/scan intervals.

4. The method of claim 3, wherein the sleep/scan interval is configured to be either a sleep interval or a scan interval, the mobile communication device alerts a wide area network base station prior to transitioning between sleep and scan modes.

5. A mobile communication device, comprising:
    a host processor;
    a wide area network modem operably coupled to the host processor;
    a personal area network modem operably coupled to the host processor;
    means for disabling transmission by the personal area network modem;
    wherein the wide area network modem and personal area network modem operate on similar frequencies;
    wherein upon the personal area network modem establishing an active link with a remote device, the active link using an in-frame retransmission protocol for transporting time-sensitive data, the mobile communication device is configured to scan for neighbor cells over the wide area network modem by:

disabling transmission by the personal area network using the active link for a scan time; and after an end of the scan time, enabling transmission by the personal area network using the active link for at least a minimum wait time;

wherein the scan time maximum is equivalent to a personal area network frame duration minus a last in-frame retransmission slot duration and the wait time minimum is equivalent to the last in-frame retransmission slot duration.

6. A mobile communication device as defined in claim 5, wherein the personal area network has a retransmission period of 7.5 milliseconds and 3 pairs of alternating transmit and receive slots, each scan being no longer than 2.12 milliseconds and the spacing between consecutive scans is not less than 1.63 milliseconds.

7. A mobile communication device as defined in claim 5, wherein the wide area network alternates between a listening interval and a sleep/scan interval, commencing the neighbor cell scan is performed only during sleep/scan intervals.

8. A mobile communication device as defined in claim 7, wherein the sleep/scan interval is configured to be either a sleep interval or a scan interval, the mobile communication device alerts a wide area network base station prior to transitioning between sleep and scan modes.

* * * * *